United States Patent [19]

Lienau

[11] 4,422,041
[45] Dec. 20, 1983

[54] MAGNET POSITION SENSING SYSTEM

[75] Inventor: Jeffrey A. Lienau, Huntsville, Ala.

[73] Assignee: The United States of America as represented by the Secretary of the Army, Washington, D.C.

[21] Appl. No.: 288,595

[22] Filed: Jul. 30, 1981

[51] Int. Cl.³ .............................................. G01B 7/14
[52] U.S. Cl. .................................. 324/207; 324/174; 324/208; 89/1.8; 89/1.816
[58] Field of Search ............... 324/207, 208, 179, 174, 324/228, 232; 340/686; 89/1.8, 1.816, 8; 244/3.16

[56] References Cited

U.S. PATENT DOCUMENTS

| | | | |
|---|---|---|---|
| 3,024,453 | 3/1962 | Ransam | 324/227 X |
| 3,417,700 | 12/1968 | Furlani | 102/209 |
| 3,421,080 | 1/1969 | Lightcap | 324/179 |
| 3,843,923 | 10/1974 | de Vries et al. | 324/228 |
| 3,906,339 | 9/1975 | Leisterer | 324/208 |
| 3,945,459 | 3/1976 | Oishi et al. | 324/174 X |
| 4,047,816 | 9/1977 | Pell et al. | 356/152 |
| 4,072,281 | 2/1978 | Miller et al. | 244/3.16 |
| 4,095,145 | 6/1978 | Terranova et al. | 315/383 |
| 4,107,601 | 8/1978 | Barmeier, Jr. et al. | 324/200 |
| 4,210,865 | 7/1980 | Nikolaev et al. | 324/207 |
| 4,372,192 | 2/1983 | Lienau | 324/208 X |

FOREIGN PATENT DOCUMENTS

| | | | |
|---|---|---|---|
| 190289 | 6/1957 | Fed. Rep. of Germany | 324/207 |
| 55-155202 | 12/1980 | Japan | 324/208 |

Primary Examiner—Gerard R. Strecker
Assistant Examiner—Warren S. Edmonds
Attorney, Agent, or Firm—Robert P. Gibson; Anthony T. Lane; Freddie M. Bush

[57] ABSTRACT

Magnetic position sensing for an object is disclosed wherein the analogue of the distance between an object and a sensor is detected for indicating changes in object position in one, two, or three dimensions. An accurate, and continous output signal indicative of object position and incremental changes in that position are obtained. Additionally, magnetic sensing provides motion sensing of a support structure or velocity and acceleration sensing of an object.

4 Claims, 7 Drawing Figures

MAGNET POSITION SENSING SYSTEM

DEDICATORY CLAUSE

The invention described herein may be manfactured, used, and licensed by or for the Government for governmental purposes without the payment to me of any royalties thereon.

BACKGROUND OF THE INVENTION

Magnetic position detection has been accomplished in the past but is limited in that only low accuracy detection of the closeness of an object to a sensor is detected. The detector or sensor produces an output when the object is within a specific distance from the sensor. This proximity technique detection does not produce an output that accurately indicates the analogue of the distance between sensor and object over a wide range of positions. Additionally, current prior art methods precisely measure the distance between the sensor and the sensed object with the object at only one linear orientation relative to the sensor. Prior art sensing circuits utilize proximity detectors, switches, and trip wire circuits for detecting object position and motion. These types of systems are subject to false detection signals due to vibration of the object and often require physical contact with the object.

SUMMARY OF THE INVENTION

The magnetic position sensing system senses position and angular attitude of an object without physically touching the object. Changes in a magnetic field between the sensors and the object occur when the object moves. This field varies as the object moves in any plane with respect to the sensor and allows detection of these changes to occur.

DESCRIPTION OF THE PREFERRED EMBODIMENT

Figure 1:
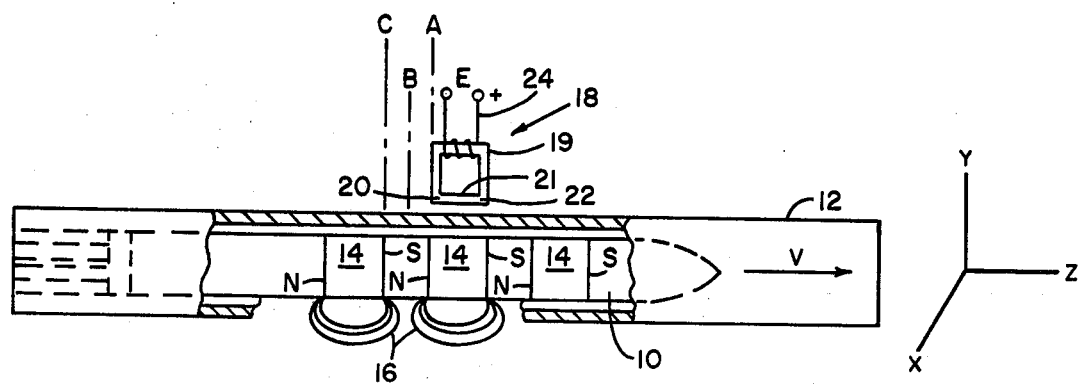
FIG. 1 is a simple embodiment of the invention utilizing a single sensor with a missile or projectile.

Referring now to the drawings wherein like numbers represent like parts, FIG. 1 discloses a moveable object 10, such as a missile or projectile which is disposed in a support structure such as launch tube 12. Cylindrical bands 14 for providing magnetic fields are disposed around the circumference of object 10 and are equally spaced apart. Bands 14 may identify permanent magnets having a north pole and south pole orientation so that magnetic fields 16 are developed. Alternatively, bands 14 may be electromagnets. A sensor 18 is disposed adjacent launch tube 12 so that flux lines from the magnetic fields 16 can pass through the sensor when it is in the proximity of the respective fields. While various types of sensors may be used, sensor 18 is typically an electromagnetic core material 19 formed in a rectangle. When exposed to a magnetic field, core 19 takes on the polarization characteristics of a magnet and magnetic flux density is developed in the core material 19. When the magnitude of the flux changes, an electromagnetic force (emf) will be introduced in the coil 24 providing a variable output voltage E. With bands 14 spaced apart and positioned to provide individual magnetic fields, sensor 18 may be disposed adjacent launch tube 12 so that flux lines pass through core material 19. During longitudinal movement, when the sensor 18 passes over a strong magnetic field a peak E (max) or valley E (min) output is obtained depending on the north-south orientation of the bands. When the sensor is over a relatively constant field area a low voltage or null $E_o$ is obtained.

Projectile 10 is shown oriented in a coordinate system wherein the projectile longitudinal axis lies substantially parallel with or coaxial with the Z axis of the coordinate system and perpendicular to the x and y axis prior to launch. Any movement of projectile 10 along the Z axis (longitudinal motion) causes the magnetic field through sensor 18 to increase or decrease with proximity to the polarized bands 14. Similarly, displacement of projectile 10 in any x-y plane (radial or lateral motion) such that the sensor 18 is closer to or further from the surface of the projectile changes the magnetic field strength passing through the sensor. When these changes occur an output voltage E is generated.

Figure 2:
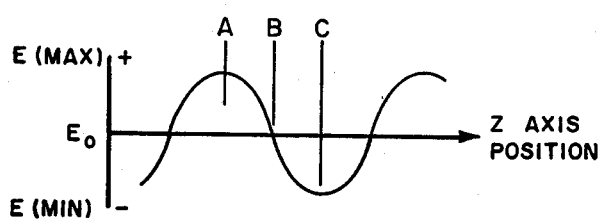
FIG. 2 is a graph of the sensed signal output for the system of FIG. 1.

FIG. 2 shows a curve indicating variation of the output voltage sensed with movement of either the projectile or the detector at a constant velocity along the Z axis. Thus as shown in the embodiment of FIG. 1, with the center of sensor 18 passing over the edge of a band 14 a maximum positive output E occurs at (A). As the sensor position changes to a midpoint (B) between bands a null or zero reference point is reached. As the position changes to point (C) the voltage sensed is opposite in polarity at E (min). If the projectile were accelerating along the Z axis the output signal frequency of E would increase with time resulting in closer spacing between successive output voltage cycles.

Figure 3:
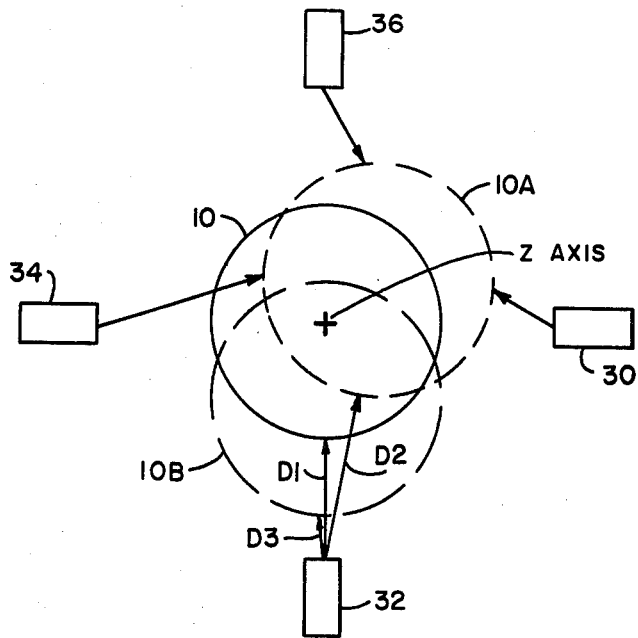
FIG. 3 is a preferred embodiment of magnetic sensors arranged in a plane though which the object is positioned or must pass.
Figure 4:
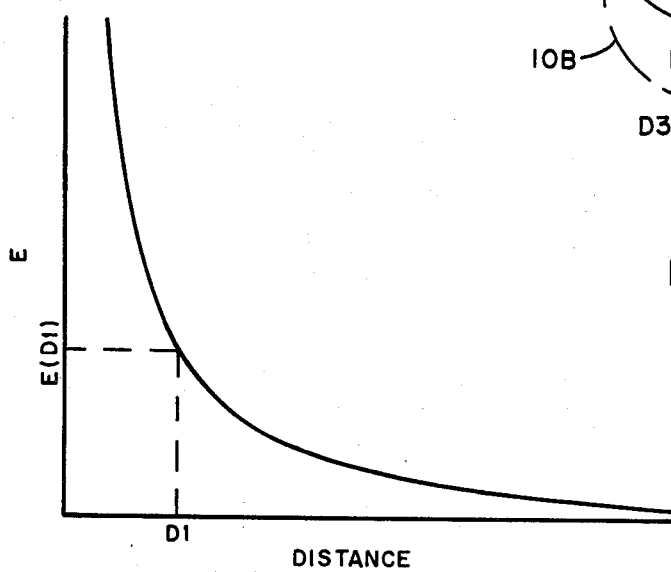
FIG. 4 is a response curve for showing variation in sensor output for a single sensor and object position variation.

FIG. 3 is a schematic view of a projectile 10 or circular object taken along the Z axis. Sensors 30, 32, 34, and 36 are disposed in the x-y plane at 90° intervals or along the axes an equal distance from the longitudinal axis (Z). Ideally, the Z axis is also the flight path center until the projectile is clear of housing 12. A slight shift of projectile 10 to position 10A or position 10B, shown in dashed lines, changes the strength of the magnetic field sensed by the detectors as the individual bands of magnetic fields pass between the sensors, indicating erratic or mallaunch conditions. Distances D1, D2, and D3 are shown from sensor 32 to the projectile 10 for the various positions to show the change in position between a sensor and the object. Assuming that movement off center to the position 10A occurs and it is equidistant between detectors 30 and 36, the output voltage from detectors 30 and 36 would be equal and higher than that of the desired output for a desired flight pattern centered along the Z axis. Similarly, the voltage output of detector 32 and 34 would be equal and lower in value. For movement of the projectile to the off center 10B position the output of detector 32 would be higher, detectors 30 and 34 would be lower than normal and identical, and detector 36 would be the lowest. A typical sensor output is shown in FIG. 4 where E(D1) represents the balanced or centered output voltage for the sensor-object spacing (D1). Output voltage goes up as the sensor and object come closer together.

Figure 5:
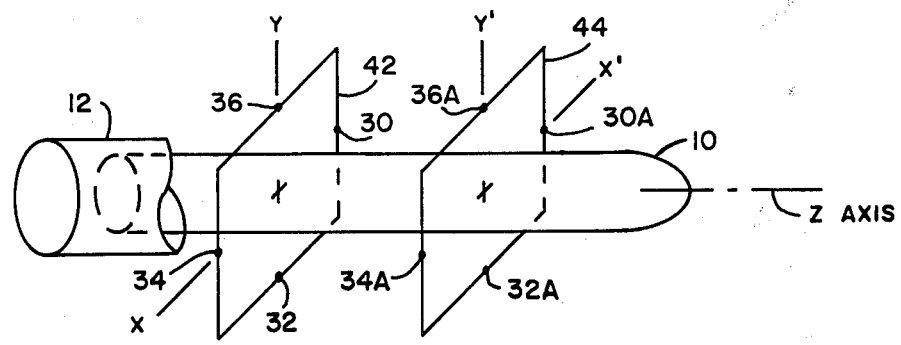
FIG. 5 is a preferred embodiment in schematic form of magnetic sensors arranged in two planes in which the object is positioned or must pass.

As shown in FIG. 5, the projectile 10 is disposed with its longitudinal axis along the Z axis of a coordinate system and passing through two x-y planes 42 and 44 which are parallel. Sensors are located along the x-y axis of plane 42 and the x'y' axis of plane 44. As shown also in FIG. 3, sensors 30, 32, 34 and 36 define the x-y plane 42. Parallel to plane 42 and with symmetrical sensor arrangement, sensors 30A, 32A, 34A, and 36A define the x'y' plane 44. This allows simultaneous position determination in two planes as the projectile passes therethrough which provides the angular position data on the projectile passing through the planes. Additional plane or positional data may be taken in a similar manner, as desired.

In operation of the system of FIG. 5, as the projectile moves through the planes 42 and 44 defined by the respective sensors, output voltages are generated at each sensor. The sensors output voltage may then be added or compared selectively in established processing equipment to provide graphic or visual presentation of the objects position and attitude at various points as it passes between the sensors. Each pair of sensors in planes 42 and 44 detects a coordinate position of the surface or of the center of the sensed object relative to the point of intersection of the x-y axis. Thus two pair of sensors in each plane determines the coordinate center point of the object in the plane. Since the coordinate centers of the two planes is known, any deviation in the angle between the sensed object's actual longitudinal axis and the desired longitudinal axis position (Z axis), which intersects the x-y axis of planes 42 and 44 at the center point between the sensors, is detected by the sensors. Each pair of axial sensors (30, 34 and 32, 36) detects a coordinate position of the actual center of the sensed object relative to the point of desired alignment along the Z axis, the Z axis in effect bisecting the x and y axes at the mid-point between the sensors. When differentially connected, each opposite sensor pair (30,34 etc.) outputs provide a signal that is proportional to the projectile center axis position.

Figure 6:
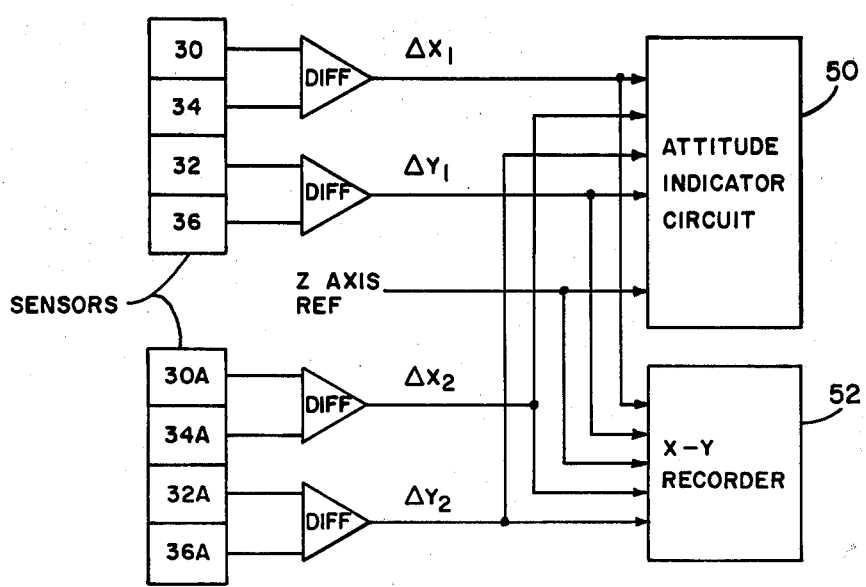
FIG. 6 is a block diagram of signal processing circuitry for the sensor outputs.

When the respective sensors provide output electrical signals in response to the magnetic field stimulation, signal processing may be done by any of a variety of means which are well established in the prior art for providing reduction and combination of signals to provide object positional data, attitude (pitch and yaw), velocity, and/or acceleration. Rapid monitoring of results can obviously be accomplished by computer processing of signal data as taught, for example, by Pell et al. in U.S. Pat. No. 4,047,816 which uses two reference stations in attitude and positional determination for a previously launched missile. More simply however is the cathode ray tube display of vectors taught by Terranova et al. in U.S. Pat. No. 4,095,145 which uses an input or zero reference in conjunction with variable inputs from two coordinate systems and allows the variable length between the x-y end points in the coordinate systems to be displayed. Similarly, Miller et al. in U.S. Pat. No. 4,072,281 uses an optical system with electronic processing to provide attitude reference for a missile that has been launched. Body axis determination circuits utilize x-y coordinate data and differencing circuits to determine attitude of the missile. Any of these and similar systems can readily be adapted to process the sensor signals. Typically, a simplified system for providing both positional and attitude measurements for the magnetic sensing system is one as shown in FIG. 6 wherein the x-axis sensors 30 and 34 output are combined to provide a $\Delta x_1$, difference signal. Similarly sensors 32 and 36 provide a $\Delta y_1$, for plane 42. The values $\Delta x_2$ and $\Delta y_2$ are also provided for the second plane 44 and since the Z axis provides a desired zero reference for both planes this data may be coupled as appropriate inputs to an attitude indicator or body axis system 50 such as that taught by Miller et al. or Terranova et al. or to an x-y recorder 52 for indicating positional and attitude data.

The sensors detect the object's position without touching it. Bands of magnetically sensitive regions along the object surface allow the magnetic field to be established in desired regions that is predictably variable with changes in the distance between the object and sensors. The differentially connected sensor pairs provide a signal proportional to the object center axis position which is in turn indicative of the distance off of the desired center axis. The magnetic coupling between sensors and object may obviously be accomplished otherwise than as is shown. For example, electromagnetic sources may be used on the object as well as on the sensors. The object 10 may have variable, permeable material bands 14 along the surface, or ferromagnetic bands. Similarly the sensors may vary in type, quantity, and configuration according to desired system measurements and design. Sensors may be coils on magnetic cores as shown, Hall effect sensors, or multiple coil/core sensors to detect both magnitude and vector direction of the flux passing therethrough. The magnetic source may be located in the sensor instead of the object.

In patent application Ser. No. 219,046 filed Dec. 22, 1980 (now U.S. Pat. No. 4,372,192 issued Feb. 8, 1983), by applicant on a First Motion Detector, a Hall-effect device 24 is used as a sensor in detecting changes in the magnetic field. This type of device can also be used as a sensor herein.

There are several sources of interference or noise that can introduce some error into the measured signals. Magnetic field deviations may occur due to different surface thickness along the body of the object, other magnetic materials close to the object, medium permeability variations, and nonlinear variations of the field between the sensor and the object. Other sources of error include sensor misalignment, and for curved surfaces such as missiles the accuracy of the radius of the cylinder or roundness and straightness of the missile and its launch tube are factors. The air medium permeability variations are minimized by the very characteristics of air and the gases that the sensors see. By making a magnetic configuration of the sensor dominate the field or surface encompassed, the effects of other magnetic materials close to the missile may be minimized. The stronger the pick-up signal is, the less interference occurs.

Figure 7:
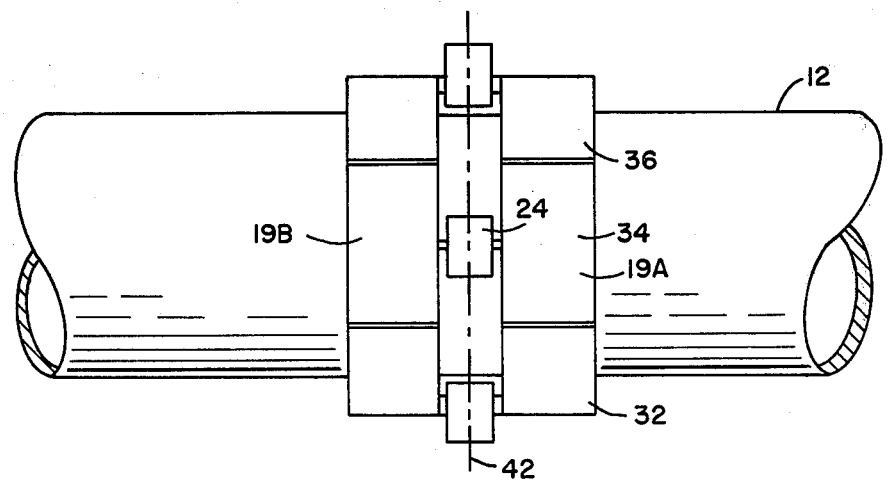
FIG. 7 is a section of a projectile launch tube having a magnetic sensor array disposed around the circumference thereof.

FIG. 7 is a section of a cylindrical launch tube 12 with an array of sensors 30 (not shown) 32, 34, and 36 disposed therearound in a plane 42, each with a large surfaced magnetic material 19A and 19B formed with cylindrical surfaces adjacent the tube 12 and coil 24 mounted therebetween. While this type and similar structures reduce some error signals, calibration of a standard launch tube or object holding or positioning device provide additional reduction in error signals.

A simple method of calibration of the sensors allows variation in signals due to missile exterior thickness and other alignment errors to be resolved. Typically, a calibration reference tube of non-magnetic material may be aligned within and coaxial with the launch tube longitudinal axis. The reference tube has coils around the surface thereof which corresponds to the position where magnetically energized zones of a projectile will be in the tube before launch. The launch tube sensors are adjusted to be equidistant from the longitudinal axis. An alternating current is coupled to the reference tube coils to generate a magnetic field which is sensed by the sensors. The reference tube may be moved rotationally and longitudinally within the launch tube to provide field measurement at selectable points within the tube. An amplifier is coupled to each sensor for measuring an output voltage indicative of the sensed magnetic field. The ideal amplifier output at each sensor should be identical. However, the errors as noted hereinabove can result in differences in the amplifier output for different sensors. This difference may be used as the basis for electrical adjustment to either the individual sensors or their output amplifier circuits so that a perfect or balanced signal output is obtained, thereby providing compensation before signal processing. Alternatively, this difference error signal may be later combined as a reference signal with the received signal for correcting the signal prior to display. Once calibrated, sensors of equal distance from the object axis detect substantially equal magnetic fields and provide an equal output. An alternative approach to calibration is to calibrate the sensors using a calibration tube to provide the mechanical and electrical adjustment for detection of errors and then, using these sensors, to adjust the actual object output field. The magnetic field source on the object, magnetic material bands, coils, or other field generating means can be aligned by measuring their output within the launch tube or holding means and increasing or decreasing the magnetic field in an area accordingly.

Although the present invention has been described with reference to the preferred embodiments, it is apparent that various modifications of the invention may be made by those skilled in the art without departing from the scope and spirit of the foregoing disclosure. Accordingly the scope of the invention should be limited only by the claims appended hereto.

I claim:

1. A magnetic position sensing circuit comprising: an object having a longitudinal axis and adapted for displacement substantially along said axis; magnetic means disposed selectively on said object for producing a plurality of magnetic fields, said magnetic means being a plurality of spaced apart magnetic field producing members disposed around the circumference of the object for radiating individual magnetic fields circumferentially outward from the object; sensing means disposed adjacent to said object for sensing magnetic field strength indicative of lateral and longitudinal position changes of said magnetic means relative to said sensing means, said sensing means being a plurality of sensor elements disposed in a plurality of parallel planes passing through the object and each element being disposed for sensing positional changes in the object; signal processing means for indicating the changes in lateral and longitudinal position between said sensing means and said magnetic means; and a centerline axis normal to said planes, said sensor elements being equidistant from said centerline.

2. A magnetic sensing circuit as set forth in claim 1 wherein said plurality of magnetic field producing members are electromagnets.

3. A magnetic sensing circuit as set forth in claim 2 wherein said object is cylindrical, and wherein said sensor elements disposed in plural planes comprise four sensor elements in each plane disposed along respective coordinate axes, each plane being substantially normal to the longitudinal axis of said object when said object is at rest.

4. A magnetic sensing circuit as set forth in claim 3 wherein respective first and second pairs of sensors being in said planes are disposed coaxially on opposite sides of said cylindrical object for sensing deviation of position of said object therebetween in response to object motion, and said signal processing means comprises a difference signal measuring system and recording circuit for indicating changes in position and attitude in response to movement of said cylindrical object through said planes.

* * * * *